United States Patent [19]

Menelly

[11] Patent Number: 4,712,606

[45] Date of Patent: Dec. 15, 1987

[54] SOLAR ENERGY STORAGE CELL

[76] Inventor: Richard A. Menelly, 87 Belden Rd., Burlington, Conn. 06013

[21] Appl. No.: 847,198

[22] Filed: Apr. 2, 1986

Related U.S. Application Data

[62] Division of Ser. No. 652,271, Sep. 20, 1984, Pat. No. 4,597,434.

[51] Int. Cl.⁴ .............................................. F28D 21/00
[52] U.S. Cl. ..................... 165/1; 165/104.12; 165/10
[58] Field of Search ...................... 165/104.12, 10, 1

[56] References Cited

U.S. PATENT DOCUMENTS

| | | | |
|---|---|---|---|
| 4,121,432 | 10/1978 | Weil et al. | 165/104.12 |
| 4,135,371 | 1/1979 | Kesselring et al. | 165/104.12 |
| 4,152,899 | 5/1979 | Herrick | 252/70 |
| 4,241,782 | 12/1980 | Schoenfelder | 165/10 |
| 4,283,298 | 8/1981 | Lane et al. | 165/10 |
| 4,291,755 | 9/1981 | Minto | 165/104.12 |
| 4,303,121 | 12/1981 | Pangborn | 165/104.12 |
| 4,309,980 | 1/1982 | McCormack et al. | 165/104.12 |
| 4,449,577 | 5/1984 | Alfven et al. | 165/104.12 |

FOREIGN PATENT DOCUMENTS

5009 10/1979 European Pat. Off. ........ 165/104.12

Primary Examiner—Albert W. Davis, Jr.

[57] ABSTRACT

A method of storing thermal energy within solar energy storage cell comprising two materials of differing adsorption properties enclosed within an airtight container. The material having the higher adsorption for water is saturated with water at 70° F. Upon exposure to solar energy, the temperature increases and the adsorbed water transfers to the material having the lower absorbtion. When the temperature decreases in the absence of solar energy, the water returns to the higher adsorption material giving off a substantial amount of heat in the form of heat of adsorption.

8 Claims, 17 Drawing Figures

SOLAR ENERGY STORAGE CELL

This is a divisional of application Ser. No. 652,271, filed Sept. 20, 1984, now U.S. Pat. No. 4,597,434, granted July 1, 1986.

BACKGROUND OF THE INVENTION

The use of the heat of adsorption of a liquid within a solar heating system is already known. U.S. Pat. No. 4,410,028 to Alefeld et al. discloses desorbing water from zeolite by the application of heat and obtaining the heat by adsorbing the water to obtain the heat of vaporization. U.S. Pat. No. 3,642,059 to Greiner discloses the adsorption of water on silica gel to obtain the heat of adsorption. U.S. Pat. No. 4,135,371 to Kesselring et al. discloses a heat storage system with adsorptive medium. A publication appearing in *Solar Energy* Vol. 23 entitled "Solar Energy Storage Using Chemical Potential Changes Associated With Drying of Zeolites" describes materials such as zeolites, alumina, charcoal and silica gel for adsorption of water and releasing heat. An article entitled "Super Cystals Generate Steam Heat" by David Scott appearing in the Mar. 19, 1980 issue of *Popular Science* discloses a commercially available system employing zeolites, pumps, heat exchangers and condensers capable of heating an entire house.

In each of the aforementioned Patents and publications, water is adsorbed on the adsorbing material until the material is saturated and the material is either displaced with dry adsorbent or a sophisticated heater and pump are employed to remove the water and to allow the adsorbing material to be activated for further adsorption.

In the absence of vapor transfer pumps and compressors, the materials listed in the aforementioned *Solar Energy* publication, for example, require temperatures in excess of the boiling point of water at atmospheric pressure to remove some of the water in order for the material to be activated for further adsorption. It would be highly desirable to use the heat of adsorption for solar energy purposes with materials that are capable of releasing water at temperatures slightly in excess of 70° F. without the requirement of pumps, heat exchangers or compressors. This would allow the material to give off water under ambient sunlight conditions and to adsorb water after sundown and give off the stored solar heat as heat of adsorption.

The purpose of this invention is to provide a solar energy storage cell utilizing materials which are capable of releasing water under ordinary conditions of sunlight in a closed container and adsorbing water at sundown to release heat without requiring any of the water transfer apparatus suggested by the state of the art.

SUMMARY OF THE INVENTION

The invention comprises a solar energy storage cell wherein two inert materials having different adsorptive properties for water are contained within a common air-tight enclosure. The higher adsorption material is saturated with water at 70° F. while the other material having the lower adsorption is either dry or initially unsaturated. Upon exposure to sunlight, the saturated material increases in temperature releasing water to the less adsorptive material. The water transport continues to occur providing the temperature is in excess of 70° F. and providing the less adsorptive material does not attain saturation. At sundown, when the temperature of both materials decreases, the water is selectively adsorbed by the material having the higher adsorption. Heat is released upon adsorption until the water is completely re-adsorbed by the higher adsorption material. In one embodiment, silica gel comprises the higher adsorptive material and is saturated with 40% water at 70° F. The lower adsorption material comprises an attapulgite clay which was previously heat treated by subjecting to a mean temperature of 900° F. for one hour.

BRIEF DESCRIPTION OF THE DRAWINGS

FIGS. 1A–4A are front views in partial sections of the solar energy storage cell according to the invention at various times of the day;

GENERAL DESCRIPTION OF THE INVENTION

Figure 2:
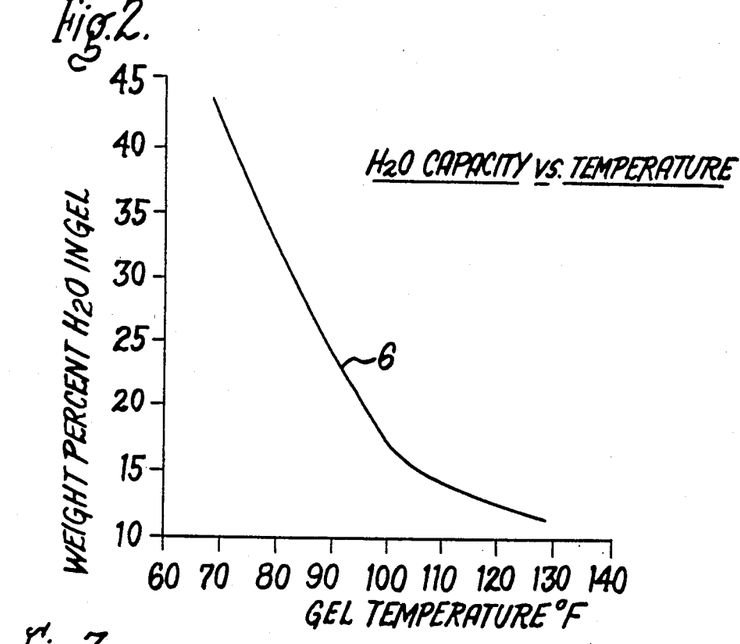
FIG. 2 is a graphic representation of the water capacity of silica gel as a function of temperature for constant relative humidity.
Figure 3:
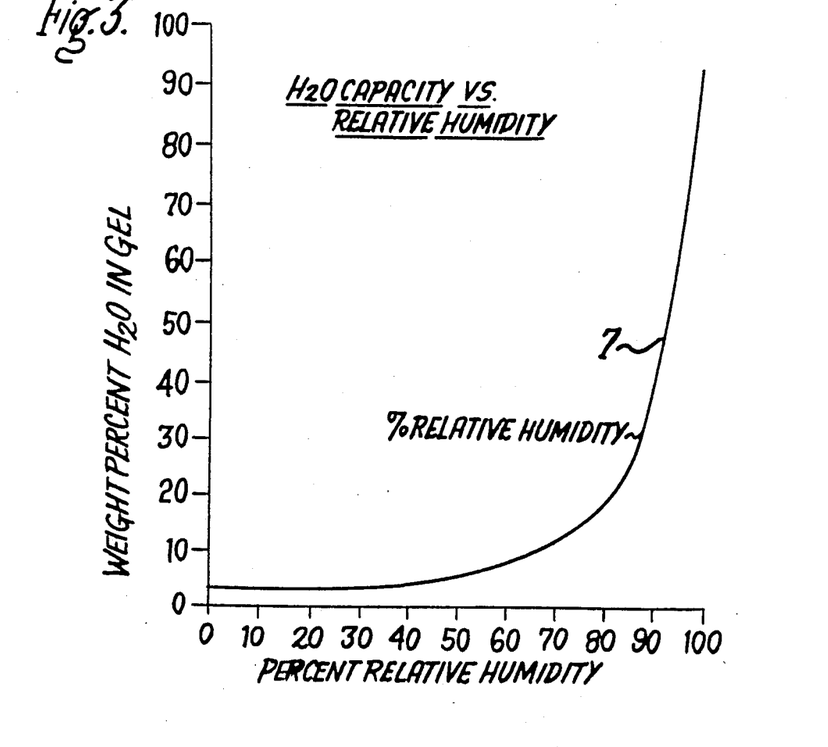
FIG. 3 is a graphic representation of the percent water in silica gel as a function of percent relative humidity.

It is known that activated carbons, silica gels and clays have a high degree of adsorption for water and that such materials exhibit an increase in temperature upon adsorption due to the high heat of adsorption. It is also known that the reaction is reversible such that when the adsorbed water is driven off the material is again active for re-adsorption. The heat of adsorption for silica gels and molecular sieve materials is as high as 1500 BTU's per pound of water adsorbed. FIG. 2 shows the water capacity expressed in weight percent water per pound of silica gel as a function of temperature for a fixed dew point of 68° F. The silica gel is a porous, granular, amorphous form of silica, synthetically manufactured from the chemical reaction between sulfuric acid and sodium silicate. The silica gel is first calcined for several hours to make it active for water adsorption. The silica gel used within the examples of this invention was obtained from W. R. Grace and Company, Davidson Chemical Division, Baltimore, Maryland. FIG. 2 shows that the silica gel can hold approximately 41% water at 70° F. and approximately 17% at 100° F. If the silica gel is saturated with water at 70° F. and then heated to 100° F., 23% of the water could be removed if the dew point were kept constant at 68° F. For the dewpoint to remain constant, some means such as a high capacity vacuum pump should be employed to remove the water from the silica gel as the temperature is increased. FIG. 3 shows the percent water adsorbed by the silica gel as a function of relative humidity at a fixed silica gel temperature. If the silica gel is saturated at 70° F. to a water content of 40% and is contained within a closed container, it would be difficult to remove the water from the silica gel as the container temperature is increased because of the increase in the relative humidity within the closed container. It would be ideal to place a container full of silica gel saturated at 70° F. with 40% water in direct sunlight and allow the water to desorb as the temperature of the container increased to 100° F. When the sun goes down and the temperature of the container deceases from 100° F. downward, the silica gel adsorption capacity for water increases such that the silica gel begins to re-adsorb water. This results in the generation of heat by means of the heat of adsorption as described earlier. However, in the absence of some means to remove the water such as a vacuum pump or dry air stream, the amount of water that can become desorbed from the silica gel upon exposure to sunlight is limited by the high relative humidity generated within the closed container.

This invention contemplates providing a solar storage cell wherein a container having a material such as silica gel saturated with water at a first temperature is exposed to sunlight to allow the water to desorb from the silica gel as the temperature increases and re-adsorbs within the silica gel as the temperature decreases. This is accomplished by providing a second material having a lower adsorption for water within the container and in sufficient quantity such that the effective relative humidity within the container is governed by the second material. When the temperature of the container is decreased, the silica gel having the greater adsorption for water will begin to re-absorb the water from the second material and generate heat in the process. This is somewhat similar to the use of two different metals within a wet cell chemical battery containing an acid. The difference in the electro-chemistry between the two metals allows for the selective transport of ions in the direction of the more electro-negative material. The battery is re-charged by providing a reverse polarity to the battery electrodes by means of a battery charger. With the solar storage cell of this invention, the silica gel, molecular sieve or active carbon having high water capacity or adsorption for water is saturated with water and is placed in a container with a material having a lesser water capacity such as active clay. One such active clay is "Florex" which is a trade name of the Florodin Corporation of Berkeley Springs, West Virginia for an Attapulgite clay. The properties of this clay are described within "Clay Mineralogy" by R. E. Grim 2nd Edition, Published by McGraw Hill, New York. The clay is able to absorb approximately 30% water by weight of clay when heat treated to 1000° F. for approximately one hour. When placed in contact with saturated silica gel and heated, the clay adsorbs water from the silica gel and readily returns the water to the silica gel upon cooling. Although the Attapulgite clay is ideal in view of its chemical inertness, ease of handling and low cost, other materials having a lesser absorptivity for water than the aforementioned silica gel, molecular sieve or carbon can also be employed. A good indication of the water capacity or adsorption of any material is the heat of absorption which increases in proportion to the ability of the material to adsorb water. The heat of adsorption for the aforementioned materials range from 1000 to 1500 BTU's per pound of adsorbed water whereas the heat of adsorption for the heat treated clay is less than 100 BTU's per pound. In order to decrease the effects of air pressure, the container of silica gel and clay should contain an air vent which will allow the air to leave the container upon heating by means of a one-way valve whereby a partial pressure less than atmospheric is maintained within the container. When the clay is kept separate from the saturated silica gel and on top, the water rises readily by means of capillarity as well as by means of thermal effects. The outside surface of the solar storage cell container can be selectively coated or metalized on the outer surface to promote heat adsorption at the bottom portion containing the silica gel and heat reflection on the outer surface at the top portion which contains the clay. The clay and silica gel can be mixed to promote a more rapid transfer of water from the silica gel to the clay since more clay surface is thereby exposed to the silica gel. Although the solar storage cell is described for purposes of solar energy storage, other means can be provided for heating the solar storage cell. One means being the use of a wood stove during daytime hours to thermally charge the solar storage cell for later release of heat at night when the stove is not operating. An electric heater can be arranged in the vicinity of the silica gel either externally or within the container for desorbing the water from the silica gel into the clay during off-peak hours in the evening and allowing the water to become re-adsosrbed by the silica gel during daytime periods.

The invention can be better understood by referring now to the specific embodiments.

DESCRIPTION OF THE PREFERRED EMBODIMENT

Figure 1A:
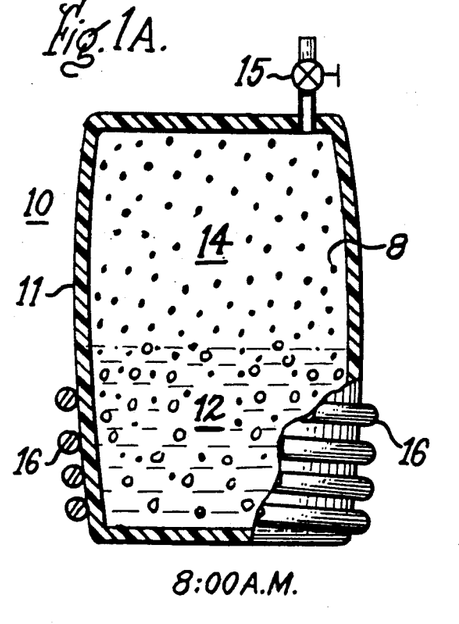

FIG. 1A shows a solar storage cell 10 consisting of a heavy plastic container 11 containing a quantity of silica gel 12 saturated at 70° F. with 40% water as the high adsorption material. For purposes of illustration the water is shown as a plurality of short lines 13. A quantity of dry attapulglite clay 14 is placed over the silica gel as the lower adsorption material. The clay is represented as a plurality of individual particles 8 to distinguish from the larger silica gel particles 9. A one-way air escape valve 15 is provided at the top of container 11 to prevent the build-up of pressure within the container during heating. A continuous heating coil 16 is arranged around the outside of container 11 in the vicinity of the silica gel 12. In the absence of sunlight, the silica gel can be desorbed by heating during the off-peak periods of lower electricity costs and allowed to re-adsorb during peak hours when electricity costs are higher. FIG. 1A shows the high concentration of water within the silica gel upon first exposing to a well insulated sun-lighted area, such as a sunroom at eight o'clock in the morning.

Figure 2A:
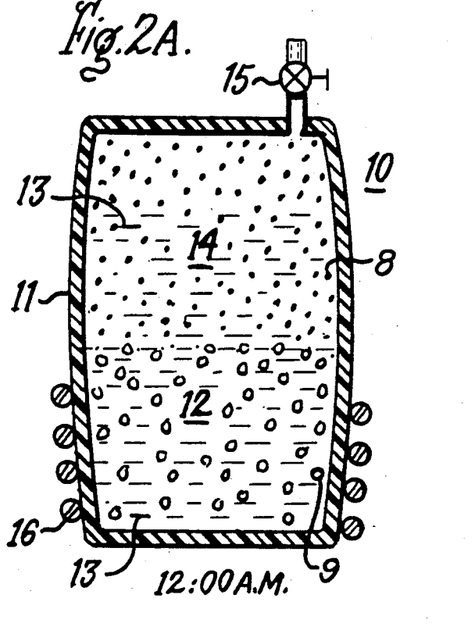

FIG. 2A shows the same solar storage cell 10 after exposure to sunlight for four hours during which period, some of the water has desorbed from the silica gel 12 and has transferred to the clay 14.

Figure 3A:
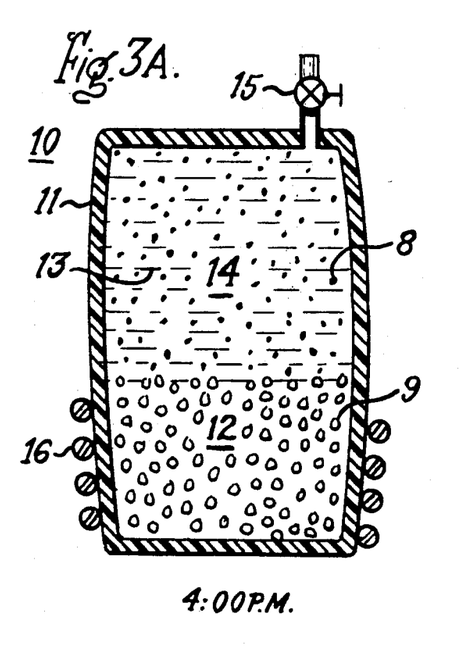

FIG. 3A shows the solar storage cell 10 at four o'clock in the afternoon at which time most of the water has left the silica gel and has become adsorbed within the clay.

Figure 4:
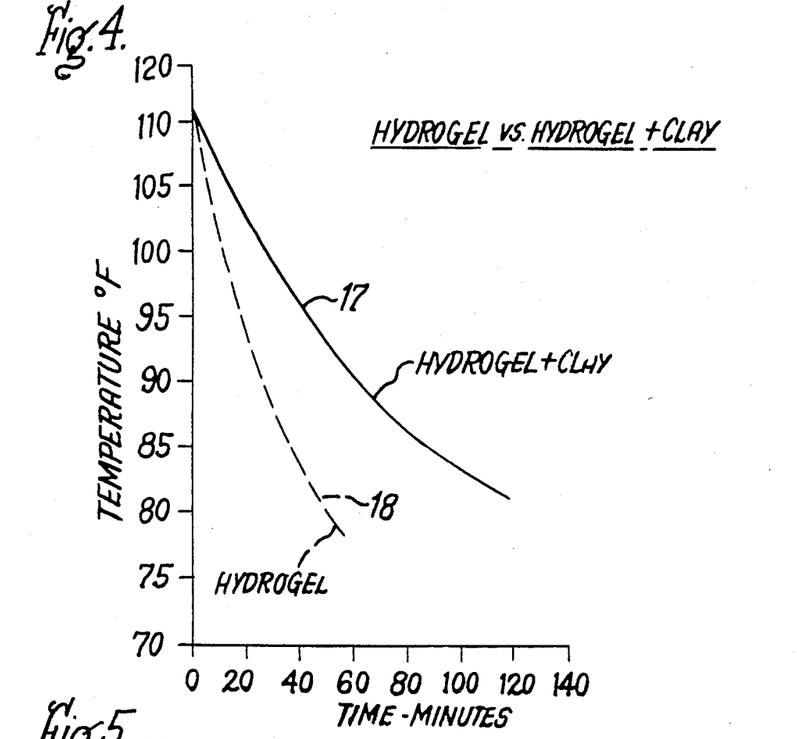
FIG. 4 is a graphic representation of the cooldown curves of hydrogel and hydrogel plus clay.
Figure 4A:
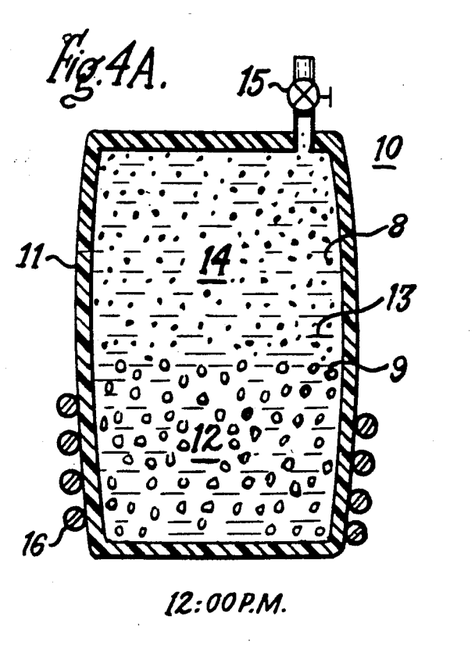

At twelve o'clock in the evening, as shown in FIG. 4A, the solar storage cell 10 contains water distributed both within the silica gel and the clay similar to that shown in FIG. 2A. The water continuously transfers from the clay to the silica gel throughout the remainder of the morning hours until reaching the concentration depicted at eight o'clock as shown earlier in FIG. 1A. The illustrations depicted in FIGS. 1A-4A are provided merely to show the relative concentrations of water. The clay never becomes completely saturated and the silica gel never becomes completely dehydrated when dry clay is employed.

To evaluate the efficiency of the various materials for adsorbing and releasing heat by the desorption and readsorption of water, the cooldown curves of the materials after heating were used as an indicator. IN EACH OF THE FOLLOWING EXAMPLES, a given weight of the material is heated in a container to approximately 100°-120° F. in a constant temperature water bath and allowed to cool in still air at an ambient temperature range of approximately 60°-70° F.

EXAMPLE 1

A one pound sample of hydrogel which is an inexpensive form of silica gel obtained from the W. R. Grace Co. containing 60% water, uncalcined, was heated to 110° F. in a closed metal container and allowed to cool in still air. A similar amount of hydrogel was heated to the same temperature and covered with a layer of dry Florex clay, occupying the remaining volume of the container and a thermometer probe was inserted down to the center of the hydrogel through an opening in the top of the container. The same thermometer was used to take alternate readings from both containers.

The results are shown in FIG. 4 wherein the hydrogel and clay mixture at 17 is compared to that of hydrogel alone at 18. By comparing the temperature between the hydrogel and the hydrogel-clay mixture at any time in their cooldown curves, it is seen that the hydrogel-clay mixture maintains a higher temperature.

EXAMPLE 2

A one pound sample of hydrogel was heated to 90° F. in a metal container and the remainder of the container was filled with dry Florex clay. One pound of tap water was heated to 90° F. in a similar container and both containers were allowed to cool in still air. Temperature readings for both were obtained through an opening in each of the containers.

Figure 5:
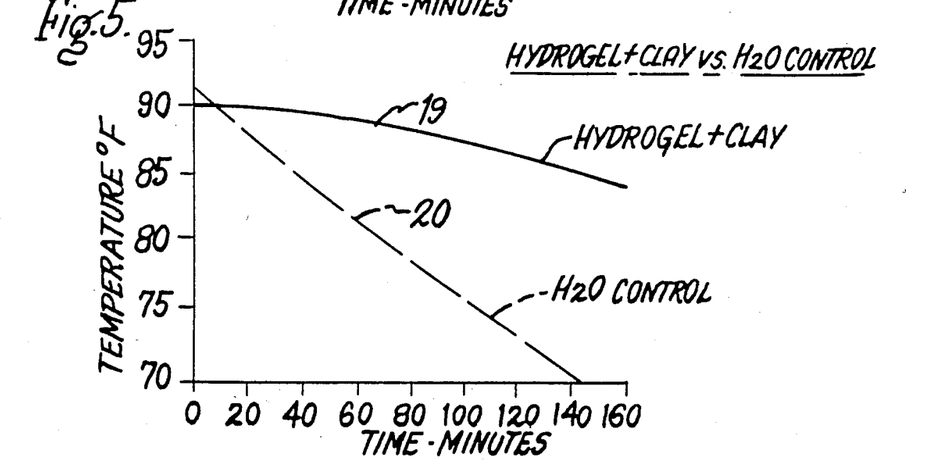
FIG. 5 is a graphic representation of the cooldown curve of hydrogel plus clay and water control.

The cooling curves for hydrogel plus clay and water are depicted at 19 and 20 respectively in FIG. 5. Water was chosen as a control since it is a commonly used solar absorbing material and has a specific heat of 1 BTU per pound which allows energy values to be easily determined. By comparing the hydrogel-clay cooldown curve 19 at any time to the water control cooldown curve 20 it is seen that the hydrogel-clay cools at a slower rate. This indicates that the cell is operating to generate heat since the published specific heat for the hydrogel material is less than 0.50 BTU's per pound. For equal weights of hydrogel and water, the hydrogel contains half as much water and still provides a higher temperature upon cooling as indicated.

EXAMPLE 3

A one pound sample of grade 03, type 8 bead silica gel obtained from W. R. Grace was saturated with tap water to 40% by weight of silica gel. The silica gel was covered with dry Florex clay filling the remainder of the metal container, which was then covered. The saturated silica gel was then heated for 2 hours at 100° F. An equal weight of saturated silica gel covered with clay was heated for ½ hour at 100° F. in a similar container. One pound of tap water was heated to 100° F. in a separate container and all three containers were allowed to cool in still air. The same temperature probe was used to take temperature readings from the center of the water and silica gel alternatively during the cooldown period.

Figure 6:
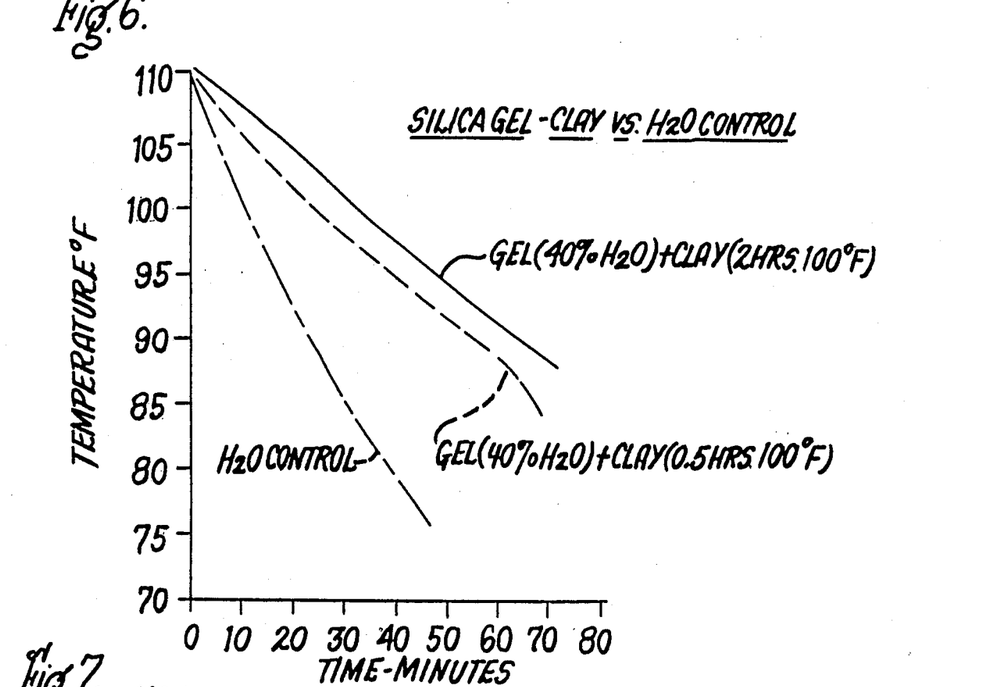
FIG. 6 is a graphic representation of the cooldown curves of silica gel plus clay and water control.

The affect of heating time on the cooldown curves for the materials of example 3 is shown in FIG. 6. Comparing the temperatures at any time indicates that increased heat is possible within the silica gel-clay cell upon longer exposure to a source of heat. It is to be clearly understood that the optimum heating times and temperatures for the solar cell of the instant invention have not as yet been determined. Futher, silica gel and clay are described as two materials having different absorption for water. Optimum materials for adsorption and the physical parameters such as pore volume, pore diameter, surface area etc. which control the adsorption properties as well as the most efficient temperatures for pre-heating the materials to make them active for adsorption have not as yet been determined.

EXAMPLE 4

A ½ pound sample of grade 42 silica gel, mesh size 6-16 obtained from W. R. Grace was saturated with tap water to 40% by weight of silica gel and mixed with clay, filling the metal container. An equal weight of saturated silica gel with no clay was prepared within a separate container and one half pound of tap water was placed in a separate container as a control. All the containers were heated to 110° F. and allowed to cool in still air. Temperature readings were obtained by inserting a temperature probe through an opening in each of the containers into the center of the silica gel material. The particular silica gel contained a cobalt salt which changes color from blue to red upon hydration. It was noted that the saturated silica gel changed to light pink color when the tap water was first added. The color changed toward a pinkish blue upon heating and returned to a pink color upon cooling to room temperature.

Figure 7:
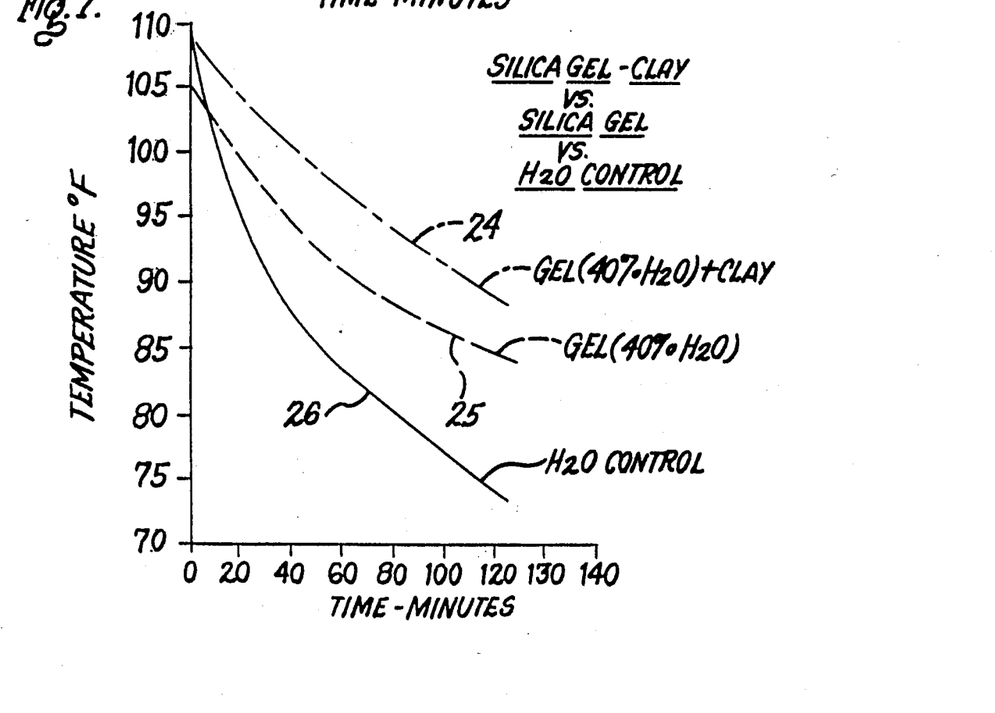
FIG. 7 is a graphic representation of the cooldown curve of silica gel plus clay, silicasilica gel and water control.

FIG. 7 contains the cooldown curves of the materials of example 4 with silica gel-clay at 24, silica gel without clay at 25 and the water control at 26. It is noted that the silica gel without the clay is hotter at any time than the water control as indicated by the cooldown temperatures but not as hot as the silica gel-clay.

EXAMPLE 5

Figure 8:
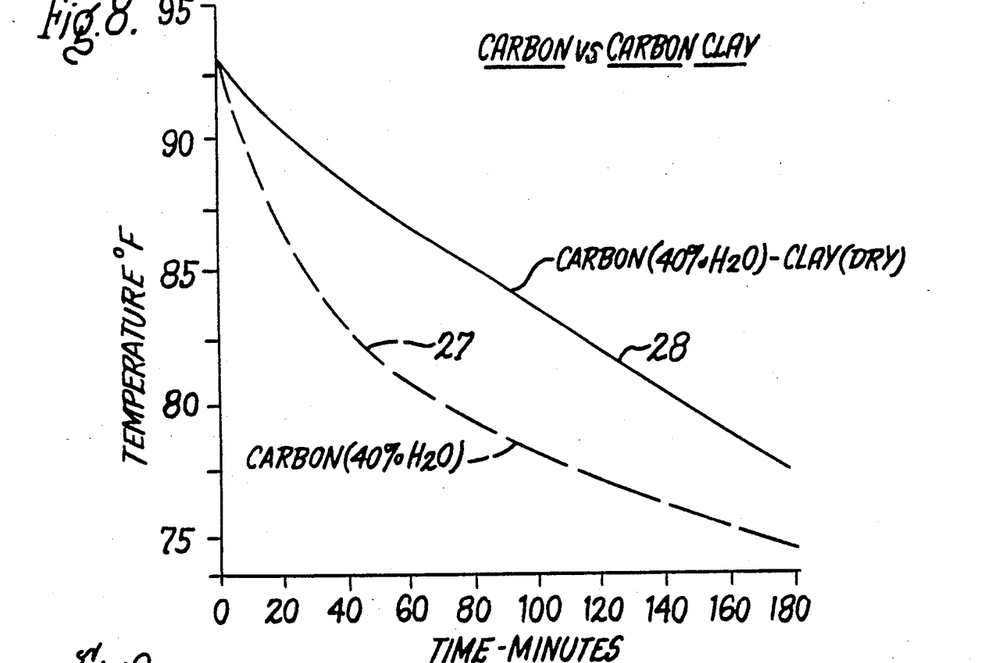
FIG. 8 is a graphic representation of the cooldown curves of carbon-clay and carbon.

A one half pound sample of activated carbon obtained from the WITCO Chemical Corporation, NY was saturated with 40% water by weight of the carbon at 70° F. and heated at 100° F. for one hour. A second sample was prepared having the same water content and covered with an equal weight of dry clay. The second sample was also heated to the same temperature for the same period of time and both samples were allowed to cool in still air at a 70° F. ambient. The cooling curve for the carbon sample is shown at 27 in FIG. 8 to be at a lower temperature than that of the carbon-clay shown at 28.

To promote the desorbtion of water from the first material within the thermal storage cell under relatively low temperature heat, the material is saturated at a relatively low temperature of approximately 70° F. to approximately 40% by weight water as described earlier. The second material is then wet to approximately 20% by weight water. By locating the second material over the first and selectively heating the first material while shielding the second material, the first material is heated much hotter than the second. The first then becomes super-saturated with water at the higher temperature while the second material remains under-saturated causing the water to pass from the first to the second. This transfer of water continues until the second material becomes saturated at its lower temperature while the first material becomes under-saturated. Upon cooling, the water then transfers from the second material which is now super-saturated at the lower temperature to the under-saturated first material, which re-adsorbs the water to release heat. The transfer of water continues until the first material again becomes saturated, i.e. 40% water at 70° F., to further promote the transfer from the first material to the second. The adsorption capacity, which is roughly determined by the heat of adsorption as discussed earlier, is selected such that the first material has a higher adsorption than the second. To further control the rate of transfer of water from the first to the second material and back, the volume of the second material can be made less than the first so that its water concentration increases more rapidly. The following examples indicate the effect of selective concentrations of water as well as selective heating on the efficiency of two materials for thermal storage. Published values for heat of adsorption in kilojoules per mole H₂O for molecular sieve, silica gel, alumina and charcoal are 79.4, 46.0, 44.7 and 41.8 respectively. The temperature rise above ambient upon initial contact with water is an indication of the heat of adsorption for each of the above materials. It is noted that molecular sieve heated to 190° F. whereas an equal weight of water applied to an equal weight of silica gel heated the silica gel to 140° F. Attapulgite clay heated to 100° F. for the same amount of clay and water.

EXAMPLE 6

Silica gel saturated with 40% water by weight of the silica gel at room temperature is covered with a layer of equal weight of activated carbon at 40% water by weight of carbon and heated within a container in a water bath at 100° F. for one hour.

Figure 9:
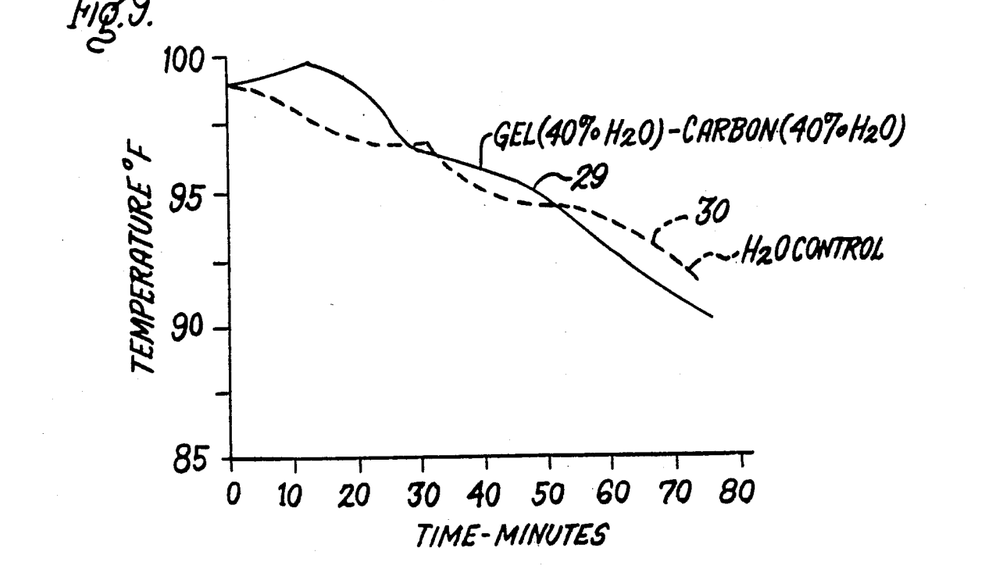
FIG. 9 is a graphic representation of the cooldown curves of silica gel and water.

As shown at 29 and 30 in FIG. 9, tne silica gel-carbon remained initially higher than the equivalent weight of water heated within the water bath as a control. The silica gel-carbon remained at a higher temperature than the water control out to approximately one half hour, at which time the silica gel-carbon and the water control reached the same temperature.

EXAMPLE 7

One half pound of silica gel saturated at 40% water by weight of the silica gel was covered with an equivalent weight of clay containing 20% water by weight of clay within a container.

Figure 10:
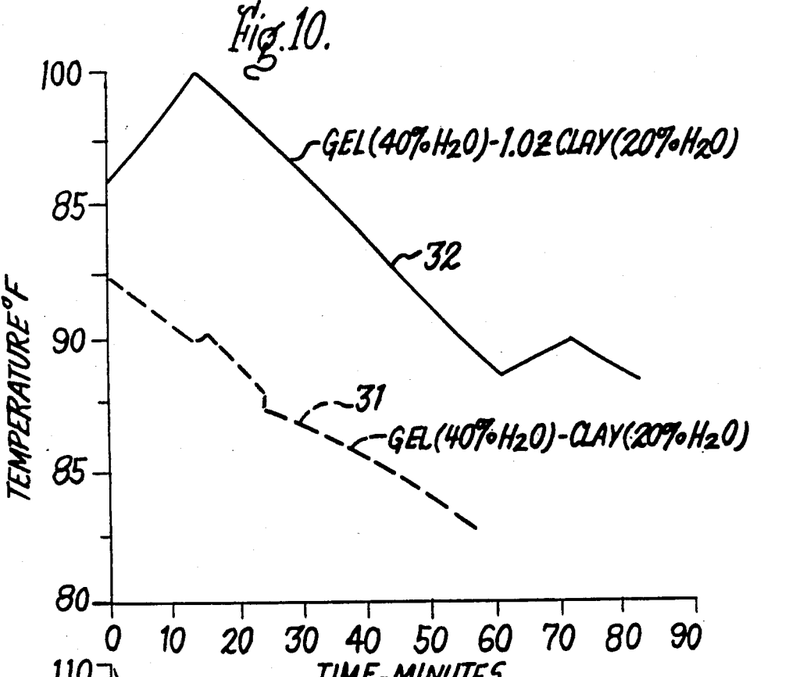
FIG. 10 is a graphic representation of the cooldown curves of silica gel and clay.

When the container was submerged within a water bath at 110° F. with the clay portion of the container remaining above and outside the water and the silica gel portion of the container within the water bath, the silica gel reached a temperature of 92° F. whereas the clay temperature remained at approximately 80° F. The cooling curve for the silica gel-clay is shown at 31 in FIG. 10. The same weight silica gel was again re-heated in a similar manner within the water bath with a fresh layer of one ounce of clay which contained 20% water by weight of clay. The silica gel reached a temperature of 97° F. at the end of one hour whereas the clay temperature remained at 80° F. As shown at 32, the silica gel with the one ounce layer of clay initially increased to 100° F. after exposing to air at 70° F. and decreased in temperature at roughly the same rate as the silica gel with the equivalent weight of clay.

EXAMPLE 8

Figure 11:
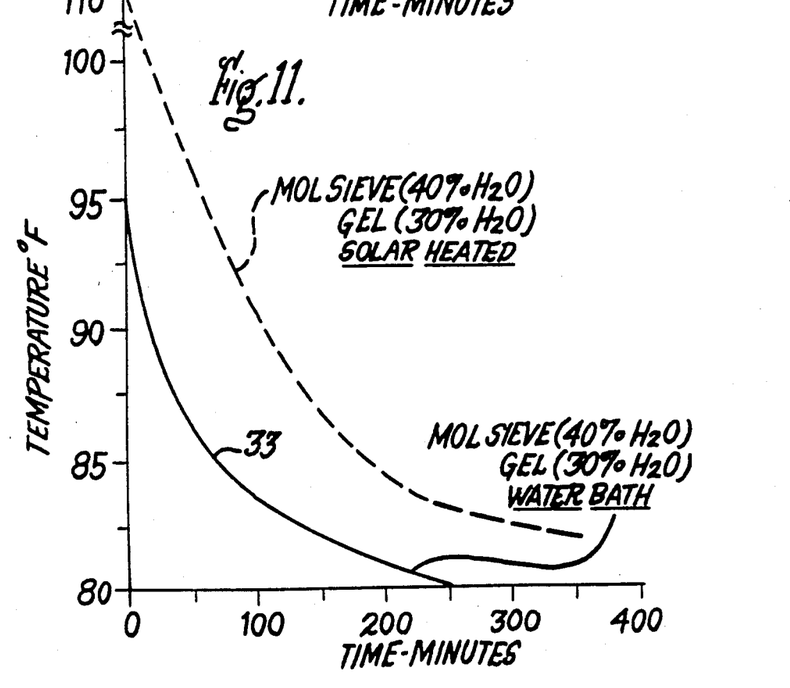
FIG. 11 is a graphic representation of the cooldown curves of molecular sieve and silica gel.

One half pound of molecular sieve zeolites also obtained from W. R. Grace and Company, was saturated with 40% H₂O by weight of sieve at 70° F. and covered with an equivalent layer of silica gel containing 30% H₂O by weight of silica gel within a container. The materials were also heated by submersing the molecular sieve material portion of the container within the heated water bath and keeping the silica gel portion of the container above the water. Upon cooling in air, the molecular sieve exhibited the cooling curve indicated at 33 in FIG. 11. The same materials within the same container were then subjected to 7 hours of sunshine within an insulated sunroom having a southern exposure. No attempt was made to selectively heat the materials so that both materials reached the same steady state temperature. The cooling curve for the solar heated materials is shown at 34. 34. It is noted that the materials reached a temperature of 110° F. after 7 hours of exposure. The rates of cooling for both methods of heating are shown to be nearly identical.

EXAMPLE 9

Figure 12:
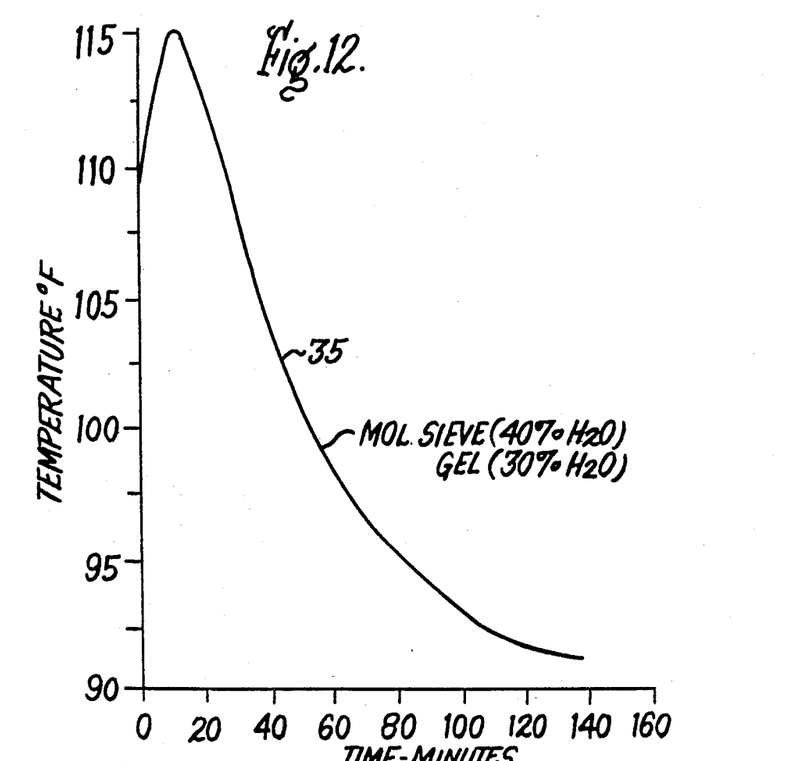
FIG. 12 is a graphic representation of the cooldown curves of molecular sieve and silica gel.

The same materials used within Example 8 were heated at 110° F. for 4 hours in a constant temperature water bath with the silica gel portion of the container out of the water. The molecular sieve reached a temperature of 110° F. while the silica gel remained at roughly 80° F. Upon cooling in air the materials exhibited cooling curves depicted at 35 in FIG. 12. The discontinuity caused by the initial exposure to still air upon cooling is similar to that observed when a saturated adsorbant such as silica gel or molecular sieve is heated within an oven in excess of 100° F. and allowed to cool upon exposure to 70° F. air. It is not well understood but is believed to be caused by the initial adsorption of water on the outer surface of the adsorbant, whereas the resultant cooling curve appears to define the effects caused by diffusion of water within the adsorbant from regions of higher to lower concentrations of water.

EXAMPLE 10

Figure 13:
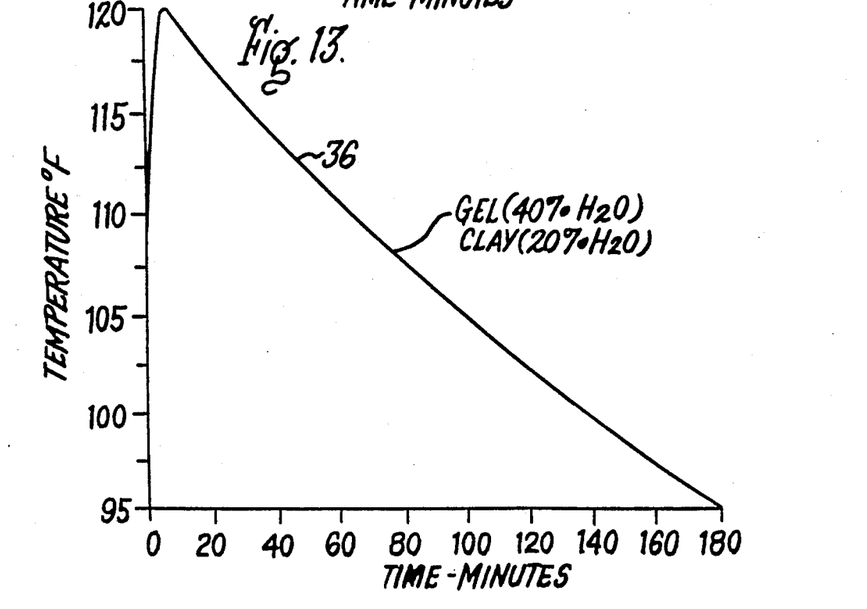
FIG. 13 is a graphic representation of the cooldown curves of silica gel and clay.

One half pound of silica gel was saturated with 40% water by weight of the silica gel and covered with one ounce of clay which contained 20% water by weight of the clay within a container. The silica gel portion of the container was heated within the constant temperature water bath at 110° F. by submerging for 2 hours and the clay portion of the container was kept at 80° F. outside the bath. The cooling curve for the silica gel-clay is shown at 36 in FIG. 13. The same discontinuity occurred upon cooling as with the materials of the previous example.

It has thus been shown that a material having a high adsorption for water can be saturated with water at a first temperature and heated to a higher temperature in contact with a second material having a lower adsorption. When both materials are allowed to cool, the water is found to become re-adsorbed within the high adsorption material and heat is generated in the process. Water was selected for all the examples of this invention because of its inert nature and low cost. It is within the scope this invention to employ chlorinated hydrocarbons which have higher vapor pressures and are more readily desorbed at practical solar operating temperatures. These materials however, are relatively expensive and could present storage and disposal problems because of their chemical properties. It is further contemplated that silica gel could be specially provided with an adsorption for water less than that of the current commercially available silica gels such that more water can be desorbed at practical solar temperatures without adding to the materials cost. A single saturated material could be employed within a closed container if the volume of the container is quite large compared to the volume of the material. This would provide a reservoir for the desorbed water should a second material of lower adsorption not be desired. However, besides increasing the overall efficiency of energy storage, the second material also allows for a smaller and more compact solar storage cell geometry.

Figure 14:
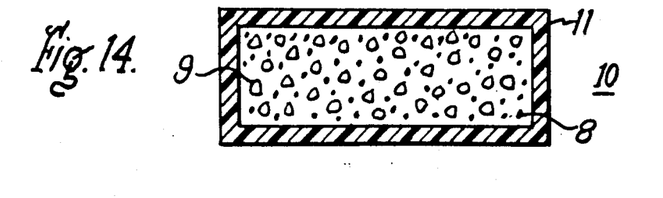
FIG. 14 is a front sectional view of an alternate embodiment of the solar energy storage cell of the invention.

FIG. 14 shows a solar storage cell 10 wherein the silica gel 9 and clay 8 are intimately mixed within a container 11. The container could comprise a plastic material in a hollow block configuration which is filled with the silica gel and clay. The silica gel would be pre-saturated with water and/or any other polar molecule liquid which is readily adsorbed by the silica gel as well as by the clay. A large number of these cells could then be stacked within an inner wall, or floor, in the vicinity of a sun room or a wood stove to generate heat when the heat source is no longer functioning. The intimate mixing of the silica gel and clay would allow the water to desorb from the clay in a very short period of time and at lower temperatures.

It is noted that when the adsorbing material is first wet with water, the water moves from the region of high concentration of water to regions of lower concentration within the material, while continuously giving off heat in the process. This continues until a fairly uniform concentration of water becomes adsorbed throughout the material. An inexpensive expedient for the solar energy storage cell of the invention would be to saturate a single material within a closed container and then selectively heat a portion of the material while keeping the remainer at a lower temperature. This could be done with the silica gel containing 40% adsorbed water described earlier by coating an upper portion of the outer surface of the container with a heat reflecting material such as silver, gold, aluminum or titanium dioxide while coating the remaining lower portion of the container with a heat adsorptive material, such as carbon black. The water within the hotter region of the silica gel would then migrate to the cooler region causing the cooler region to be super saturated in time while the hotter region becomes undersaturated. When the solar energy storage cell is no longer exposed to heat, both regions should eventually cool to the same temperature. The water within the super saturated region would migrate back to the undersaturated region continuously giving off heat until a uniform concentration of water throughout the material is again attained. It is recommended that the container be completely filled with the saturated silica gel to reduce any effects to to high relative humidity in air spaces otherwise remaining within the container.

An inexpensive solar storage cell consisting of the silica gel and/or clay could be manufactured in a standard clay brick manufacturing process wherein the porosity and specific volume of the baked brick could be tailored for the high adsorption of water from the air. When the solar storage bricks are used to align furnaces or as an insulating base or wall for fireplaces and stoves, the storage solar bricks would then continuously desorb water when heated by the fireplace, furnace or stove and later re-adsorb water from the air upon cooling to release heat. This approach would be feasible for solar applications such as with enclosed Trombe walls and sunroom floors within insulated and enclosed areas. Such porous and water adsorbant bricks would be avoided in external building usage, however, because of the heat transfer from the building due to the heat conductive properties of the adsorbed water.

Attempts to keep the relative humidity constant by the addition of calcium chloride pellets to the container along with the saturated silica gel were not completely successful. The silica gel would give up water to the calcium chloride upon heating but the calcium chloride did not readily return the water to the silica gel upon cooling. It is contemplated that a careful control of the relative weights of calcium chloride pellets and the silica gel could be arranged so that the calcium chloride would become super-saturated upon receiving the water released from the silica gel thereby returning the water to the silica gel upon cooling. This approach would take a longer time than when a second material such as clay is used-to transfer the water back to the silica gel since the reaction between the calcium chloride and water is chemical whereas the claywater adsorption is physical.

It is also known that porous metals can be produced by powder metallurgy techniques having a high affinity for gases such as hydrogen. The void volume of certain of these metals could be adjusted for adsorbing either water or a fluorinated hydrocarbon, such as trichlorofluoromethane ($CCl_3F$), which boils at 75° F. The boiling point of $CCl_3F$ is ideal for desorbing from a porous metal into an expansion chamber upon exposure to sunlight. When the sun goes down and the temperature drops below 75° F., the porous metal would adsorb the $CCl_3F$ and give off heat as heat of adsorption as well as by condensation. Zeolites such as molecular sieves could also be employed for heating with the fluorinated hydrocarbon for selective heating of small areas in view of the relatively high costs of the selected hydrocarbons and molecular sieves currently available. The low cost of substances such as silica gel, activated alumina, carbon, clay and water make them more attractive for large scale heating of homes, office buildings and factories where large quantities of adsorbants and adsorbates are required to provide the required amount of heat.

Having described my invention, what I claim as new and desire to secure by Letters Patent is:

1. A method of storing thermal energy comprising the steps of:
   providing a first material having a first heat of adsorption within a container, said first material being saturated with a liquid at a first temperature;
   exposing said container and said first material to a source of heat to increase the temperature of said first material to a second temperature in excess of said first temperature but less than the boiling point of said liquid to release some of said liquid from said first material to within said container; and adsorbing said released liquid from within said container when the temperature of said first material decreases to a third temperature lower than said second temperature to cause said first material to release heat as heat of adsorption.

2. The method of claim 1 including the step of:
providing a second material having a second heat of adsorption within said container for receiving said liquid from said first material while the temperature of said first material is increasing and for releasing said liquid to said first material while the temperature of said first material is decreasing.

3. The method of claim 1 including the step of:
providing an air vent to said container to release air from said container while the temperature of said first material is increasing.

4. The method of claim 1 including the step of selectively heating said first material to increase the rate at which the temperature of said first material is increasing.

5. The method of claim 3 including the steps of:
providing a heat adsorbing surface on the exterior of said container proximate said first material; and
providing a heat reflecting surface on the exterior of said container proximate said second material to cause said temperature of said first material to increase at a greater rate than the temperature of said second material.

6. The method of claim 1 including the step of partially evacuating said container to increase the rate at which said liquid is released from said first material.

7. A method for storing heat comprising the steps of:
exposing a first material having a quantity of adsorbed liquid to a source of heat to increase the temperature of said adsorbed liquid to a first temperature less than the boiling point of said liquid;
disorbing a part of said liquid from said first material while said first material is heated by said source of heat; and
readsorbing said part of said liquid within said first material when said first material is cooled to a second temperature less than said first temperature.

8. A method of storing heat comprising the steps of:
providing a container of material capable of adsorbing a liquid and giving off heat of adsorption when said liquid is adsorbed;
saturating said material with said liquid at a first concentration of said liquid within said material;
selectively heating a first portion of said container to a first temperature less than the boiling point of said liquid to decrease the concentration of said liquid within said first portion of said material and to increase the concentration of said liquid within a second portion of said material within said container; and
allowing said container to cool to a second temperature less than said first temperature whereby said liquid transfer from said second portion to said first portion to increase the concentration of said liquid within said first portion thereby causing said material to give off heat as heat of adsorption.

* * * * *